Oct. 9, 1962
K. HARTMANN ET AL
3,057,008
BATCH TYPE KNEADING AND MIXING MACHINE FOR
RUBBER AND PLASTIC MATERIALS
Filed March 19, 1958
4 Sheets-Sheet 4
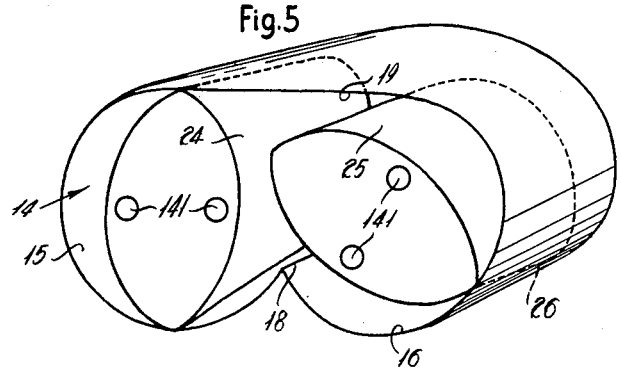
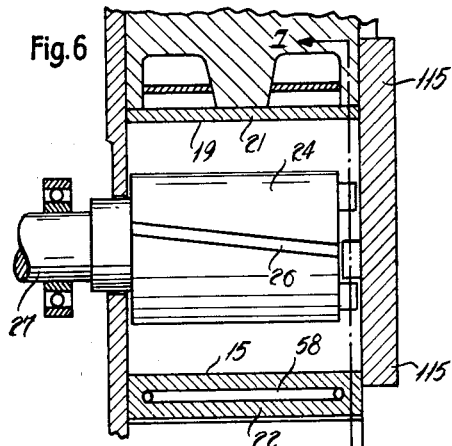
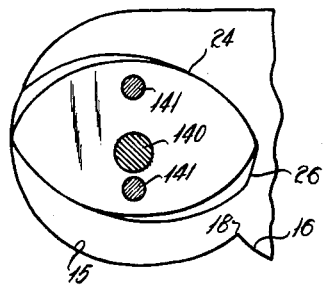
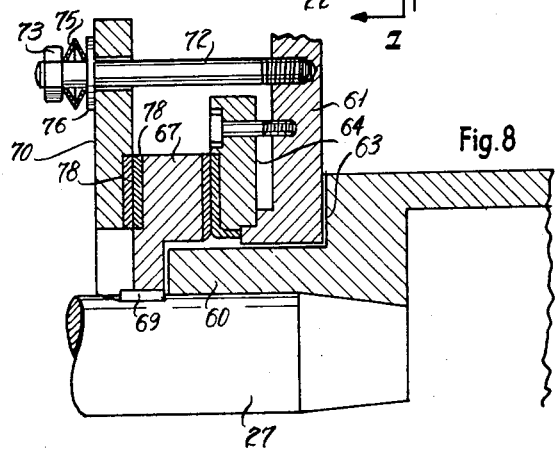
KURT HARTMANN
HEINZ HÜSING
GÜNTER SEIDEL
WOLFGANG OEPPE
JOSEF GREDIGK
INVENTORS.
BY Richardson, David and Nordon
ATTYS.

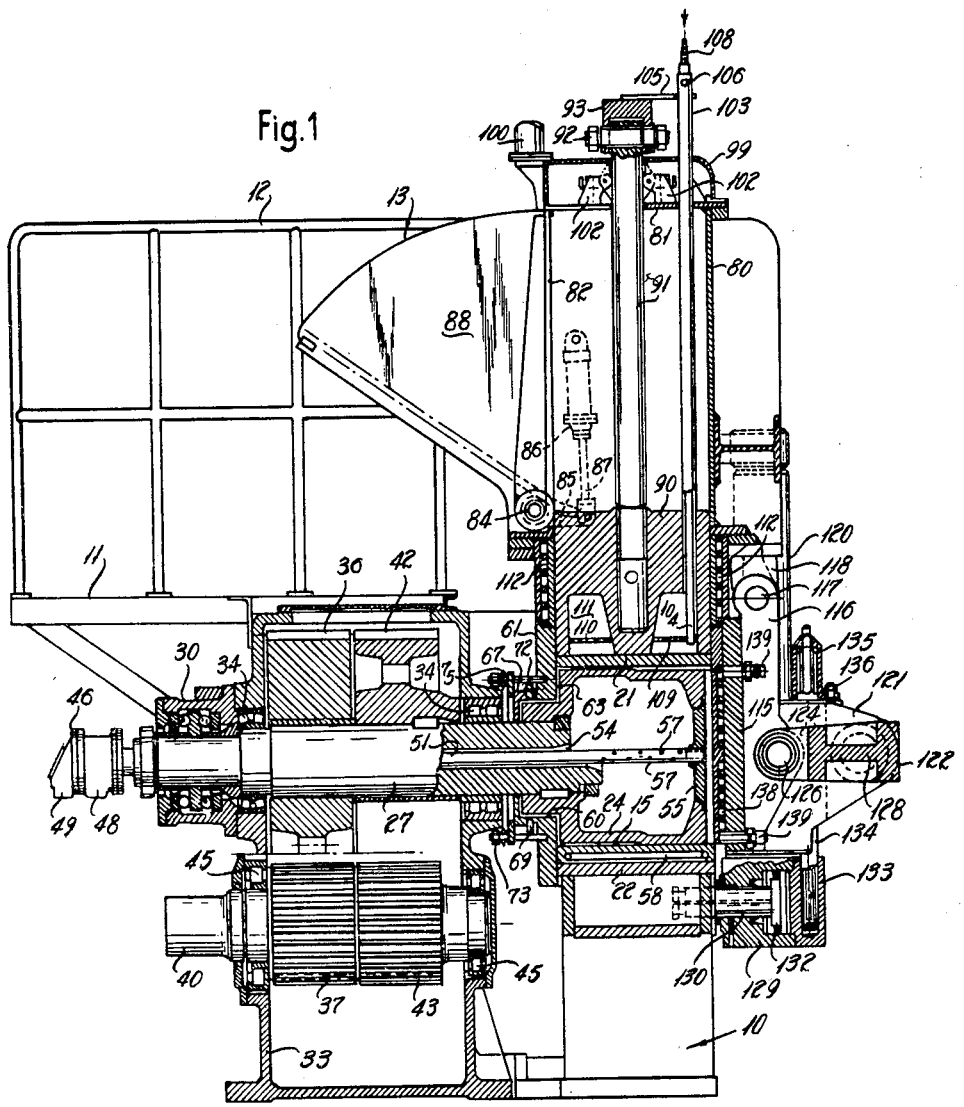

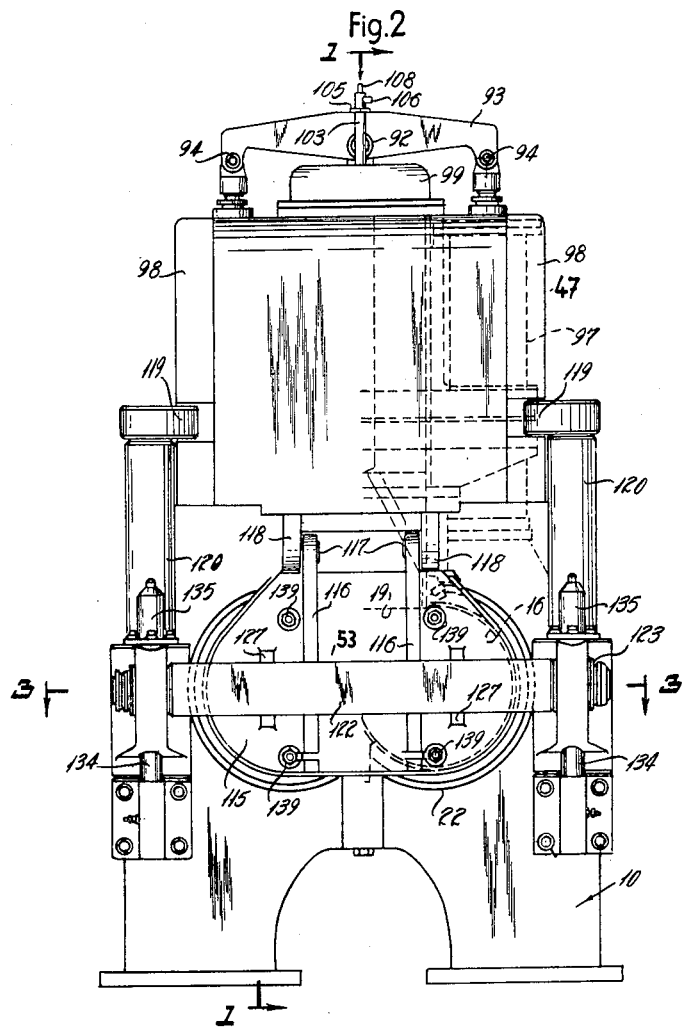

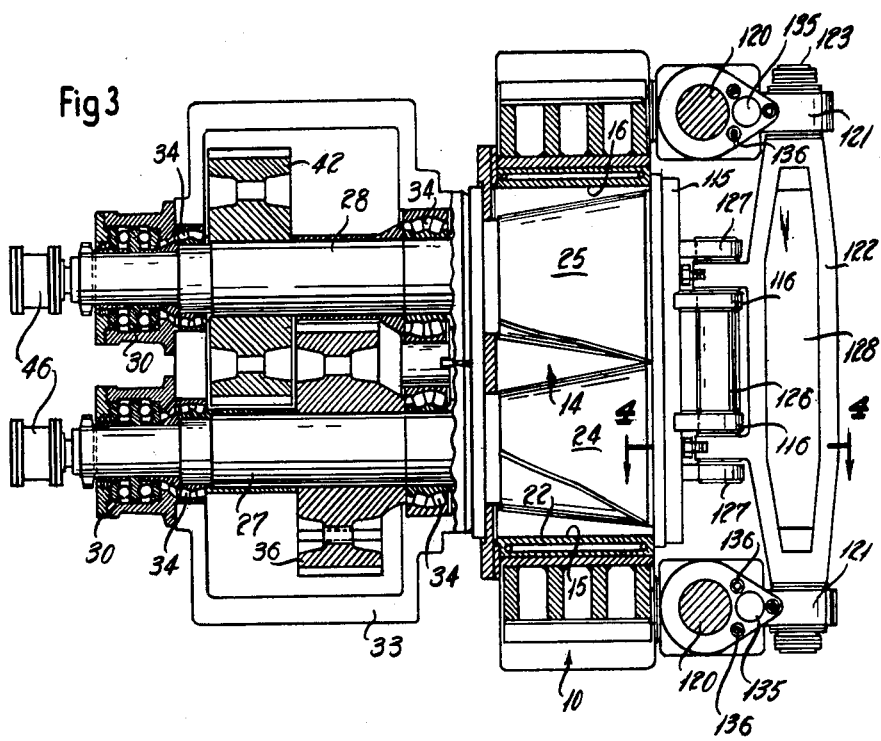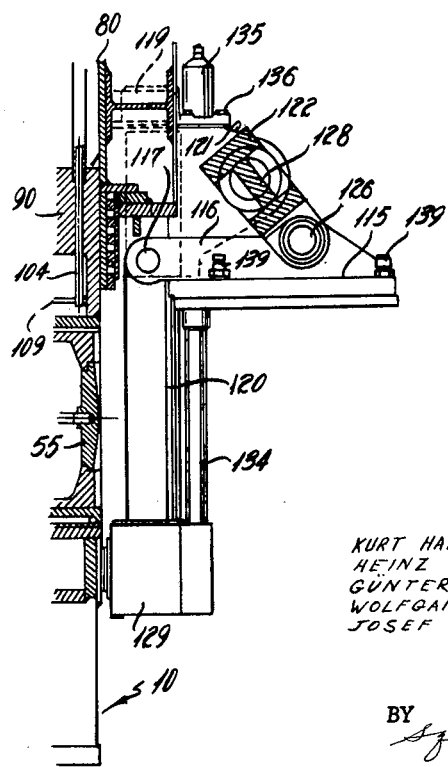

United States Patent Office 3,057,008
Patented Oct. 9, 1962

3,057,008
BATCH TYPE KNEADING AND MIXING MACHINE FOR RUBBER AND PLASTIC MATERIALS
Kurt Hartmann and Heinz Hüsing, Munich, Günter Seidel, Lochham, Wolfgang Deppe, Munich-Allach, and Josef Gredigk, Munich, Germany, assignors to Krauss-Maffei Aktiengesellschaft, Munich-Allach, Germany, a corporation of Germany
Filed Mar. 19, 1958, Ser. No. 722,441
Claims priority, application Germany Feb. 26, 1958
7 Claims. (Cl. 18—2)

The present invention relates to a batch type kneading and mixing machine for rubber and plastic materials.

In mixing machines of this character, it is essential that the mixing chamber and mixing paddles be thoroughly cleaned after the discharge of each batch to prevent residues of material left over from previous batches from being introduced into a fresh batch. Such residues may be overcured or otherwise rendered unusable by prolonged heating during the mixing of a series of successive batches. The introduction of even minute quantities of such unusable residues into a freshly mixed batch will seriously impair the quality of the new batch and may require it to be discarded.

The mixing machine of the present invention is characterized by free and complete accessibility to the entire interior of the kneading and mixing chamber and to the surfaces of the kneading and mixing paddles for cleaning purposes. The feed mechanism for introducing a charge of material into the mixing chamber is arranged to be inherently self-cleaning. The mixing paddles are readily removable from and replaceable on their respective drive shafts for complete cleaning of the mixing chamber and the paddles, when desired.

A kneading and mixing machine in accordance with the invention comprises a pair of cooperating horizontally extending kneading and mixing paddles which are arranged to rotate on parallel axes in the same direction of rotation. The paddles are of generally elliptical cross section with the ends of the major axes of the ellipses lying on helices concentric with the rotational axes of the paddles. The helices are of low pitch, the direction of which urges the batch longitudinally of the paddles toward the discharge end of the mixing chamber. The top of the mixing chamber is flat and its bottom is formed by intersecting parallel cylindrical surfaces, concentric with the rotational axes of the kneading and mixing paddles. These cylindrical surfaces extend up to the flat top surface of the mixing chamber and form its sides, thus closely surrounding approximately two-thirds of the lateral periphery of each paddle.

The charging apparatus for introducing a new batch into the mixing chamber comprises a vertical feed tube which communicates with the top of the mixing chamber. There is a side door in the tube which may be inclined between parallel plates to form a charging hopper from which the unmixed material is fed by gravity into the feed tube. Within the feed tube, there is a vertically movable feed piston, operated by fluid pressure cylinders, which forces the material downwardly into the mixing chamber. During the mixing operation, the feed piston floats upon the mass of material being kneaded and mixed. The bottom face of the feed piston may be coplanar with the top flat surface of the mixing chamber when the feed piston is in its lowermost position.

One entire end wall of the mixing chamber is formed by a hinged cover which is actuated and pressed closed by fluid pressure cylinders. After the mixing of each batch has been completed, the cover is raised and the batch removed. The other end wall of the mixing chamber is formed in part by the machine frame and in part by two specially constructed sealing glands through which the paddle drive shafts extend. Means are provided for returning to the mix, material which enters the space between the ends of the paddles and the hinged cover. Means are also provided for the circulation of a heat transfer medium for heating or cooling the mix, as desired.

Various objects, features and advantages of the invention will become apparent upon reading the following specification together with the accompanying drawing forming a part hereof.

Referring to the drawing:

FIGURE 1 is a side elevational view, partly in section taken along the line 1—1 of FIG. 2, looking in the direction of the arrows.

FIGURE 2 is an end elevational view looking at the right hand end of the machine as shown in FIG. 1.

FIGURE 3 is a plan view, partly in section taken along the line 3—3 of FIG. 2.

FIGURE 4 is a fragmentary view in sectional elevation taken along the line 4—4 of FIG. 3, and showing the hydraulically actuated hinged cover for the mixing chamber in its open or raised position.

FIGURE 5 is a diagrammatic perspective view showing the mixing paddles and mixing chamber.

FIGURE 6 is an enlarged fragmentary sectional view showing one of the mixing paddles provided with bosses for returning to the mix material which enters the space between the end of the mixing paddle and the hinged cover.

FIGURE 7 is a diagrammatic end sectional view taken along the line 7—7 of FIG. 6.

FIGURE 8 is an enlarged fragmentary sectional view showing the construction of one of the two sealing glands through which the revolving paddle drive shafts extend into the kneading and mixing chamber.

Referring to FIG. 1, the kneading and mixing machine comprises a frame designated generally as 10. A platform 11 and a handrail 12 are provided on the machine for access to a charging hopper 13, later to be described. The mixing chamber designated generally as 14, is completely open at one end and is defined laterally by cylindrical surfaces 15 and 16 (FIG. 5) which intersect at their bottom portions along a line 18. The tops of the cylindrical surfaces 15 and 16 are interconnected by a flat horizontal tangential surface 19 and constituting a side wall. The flat surface 19 is formed in part by members secured to the machine frame 10 and in part by the under side of a plate 21. The plate 21 forms the bottom of a feed piston described in greater detail below. The cylindrical surfaces 15 and 16 are the inner surfaces of a correspondingly shaped wall 22 (FIG. 1) of the mixing chamber.

A pair of cooperating mixing and kneading paddles 24 and 25 are disposed in the mixing chamber 14. The mixing paddles 24 and 25 are hollow and are disposed to cooperate, respectively, with the cylindrical surfaces 15 and 16. The cylindrical surface 15 extends about two-thirds of the way around the paddle 24 and the cylindrical surface 16 similarly extends about two-thirds of the way around the paddle 25. The paddles 24 and 25 are of generally elliptical cross section. As shown, the cross sectional shape is defined by the intersection of two circular arcs the apices of which are located on diametrically opposed symmetrical helices 26. The longitudinal axes of the helices 26 coincide with the rotational axes of their respective paddles. If the cross sectional shape were truly elliptical, then the ends of the major axes of the ellipses would lie on the helices 26.

The paddle 24 is removably mounted on a drive shaft 27 and the paddle 25 is similarly mounted on a drive shaft 28. The kneading and mixing paddles 24 and 25 are keyed to their respective shafts 27 and 28 for rotation therewith and are so arranged that each paddle may be disconnected and removed from its shaft by simply pulling the paddle longitudinally. The paddles 27 and 28 are so arranged, as described in greater detail below, that longitudinal thrusts are developed which tend to hold the paddles on their respective shafts. Accordingly, the paddles may be frictionally held or otherwise readily detachably secured to their respective drive shafts. To accommodate these thrust forces, the shafts 27 and 28 are provided with individual thrust bearings 30 and 31, respectively, mounted in a gear box 33. The shafts 27 and 28 are journaled in radial roller bearings 34 mounted in the gear box 33.

A gear 36 mounted fast on the shaft 27 meshes with a pinion 37 mounted on a main drive shaft 40. A similar gear 42 which is mounted on shaft 28 meshes with a further pinion 43 mounted fast on the main drive shaft 40. The main drive shaft 40 is journaled in bearings 45 mounted in the gear box 33. The main drive shaft 40 is adapted to be connected to a motor or other drive means (not shown). The gearing 36—37—42—43 is such that the shafts 27 and 28 revolve in the same direction, being driven by the main drive shaft 40.

Each of the drive shafts 27 and 28 is hollow and is connected at its free end with a stuffing box 46 having outlet and inlet connections 48 and 49, respectively, for the circulation of a fluid heat transfer medium. A tube 51, of external diameter smaller than the internal diameter of its associated shaft 27 or 28, communicates with the inlet 49 of stuffing box 46 and extends coaxially through the longitudinal passage 54 in the shaft 27 or 28 to an end wall member 55 which is provided in each of the hollow paddles 24 and 25. The end of the tube 51 which terminates at the end wall member 55 is plugged and is threaded into the end wall member 55. It may be quickly disconnected prior to removal of its associated paddle for cleaning purposes by disassembling the stuffing box 46 and unscrewing the tube 51. Within the interior of the paddle 24 or 25, the tube 51 is provided with a series of orifices 57 which serve as spray nozzles for distributing the heat transfer medium over the walls of its associated kneading and mixing paddle. The heat transfer medium returns to the outlet 48 of the stuffing box 46 through the passage 54 exteriorly of the tube 51. The heat transfer medium may deliver heat to the mix or remove heat, depending upon the nature of the material being kneaded and mixed. The double cylindrical wall 22 of the mixing chamber 14 is hollow, providing a passage 58 for circulation of the heat transfer medium.

The paddle 24 and 25 each comprise an integrally formed hub portion 60 which is secured to its associated drive shaft 27 or 28. The hub 60 is circular and extends through a corresponding aperture in a flat vertical end wall 61 of the mixing chamber 14.

As may best be seen in FIG. 8, the hub 60 is surrounded by a shoulder 63 which is closely spaced from the vertical end wall 61. A stationary sealing ring member 64 surrounds the hub 60 exteriorly of the mixing chamber 14 and is secured by screws 66 threaded into the outer side of the end wall 61. A revolving sealing ring member 67 is axially slidably fitted on each of the shafts 27 and 28, being connected for rotation with its associated shaft by a key 69. A pressure ring member 70 is longitudinally slidably mounted on studs 72 threaded into the vertical end wall 61 of the mixing chamber 14. The pressure on the sealing ring members 64 and 67 may be adjusted by means of nuts 73 threaded on the studs 72. When tightened, the nuts 73 press cup-type spring washers 75 against flat washers 76 interposed between the spring washers 75 and the pressure ring member 70. The three ring members 64, 67 and 70 are provided with inserts 78 which slidingly engage each other during rotation of the revolving sealing ring member 67. The inserts 78 are formed of carbide cutting tool material to minimize wear. The cooperating sealing ring members 64 and 67 form a sealing gland which prevents leakage of the mix out of the mixing chamber 14 around the hubs 60 of the paddles 24 and 25.

Material to be mixed is inserted in a vertically extending cylindrical feed tube 80 the lower end of which communicates with the mixing chamber 14. At its upper end, the feed tube 80 is closed by a cover plate 81. The upper portion of the feed tube 80 comprises a side door 82 of arcuate transverse cross section. When closed, the door 82 tightly seals and laterally closes the upper portion of the feed tube 80. The lower end of the door 82 is fixed to a freely revoluble horizontal shaft 84 appropriately journaled in the machine frame 10. At one end, the shaft 84 is provided with a crank arm 85 the free end of which is connected for actuation by a fluid pressure cylinder 86. When the piston rod 87 of the cylinder 86 moves upwardly, the door 82 swings in a counterclockwise direction as viewed in FIG. 1 between two spaced parallel sector-shaped side plates 88 to form the sloping bottom of the delivery hopper 13. When the piston rod 87 moves downwardly, the door 82 moves in a clockwise direction and becomes effectively a part of the side wall of the feed tube 80.

A feed piston 90 of circular cross section is vertically reciprocable in the feed tube 80. The piston 90 is fixed to the lower end of a feed piston rod 91. The feed piston rod 91 extends freely through the cover plate 81 and its upper end is connected by a bolt 92 to the center of a horizontally extending yoke or crossbar 93. The ends of the yoke 93 are connected by pins 94 (FIG. 2) to the upper ends of the piston rods 96 of a pair of fluid pressure operated cylinders 97 disposed in cylinder housings 98. The piston rods 96 elevate the feed piston 90 above the bottom of the door 82 to provide an inlet passage for the introduction of a new batch of material to be mixed into the feed tube 80, with the door 82 inclined to provide a bottom for the charging hopper 13. After the door 82 has been closed, the feed piston 90 is lowered to force the material to be kneaded and mixed downwardly through the feed tube 80 and into the mixing chamber 14.

The top of the feed tube 80 is provided with a top cover member 99 which overlies the cover plate 81. A duct 100 communicates with the space beneath the cover member 99 and may be utilized for venting gases which may be generated during the course of the kneading and mixing operation. These gases may flow through the aperture in top plate 81 through which the piston rod 91 passes. Mounted on the top plate 80 below the cover member 99 are vibration dampers or snubbers 102 (FIG. 1) which are in spring pressed lateral sliding engagement with the piston rod 91.

Two radially spaced concentric tubes 103 and 104 extend upwardly from the feed piston 90 for the circulation of a fluid heat transfer medium to the feed piston 90. The upper end portion of the outer tube 103 is fixedly connected to the yoke 93 by a brace 105. The outer tube 103 is provided with a side outlet 106 for the heat transfer fluid and the inner tube 104 is provided with an upwardly directed inlet 108. The inlet 108 and outlet 106 are adapted to be connected to flexible hoses (not shown) which extend to suitable means for circulating the heat transfer medium and maintaining it at the desired temperature.

The bottom of the feed piston 90 is closed by the plate 21. A horizontal baffle plate 109, apertured at 110, is disposed in an annular recess 111 formed on the underside of the feed piston 90. The top of the annular recess 111 communicates with the outer tube 103 leading from the feed piston 90 to the outlet 106. The heat transfer medium thus flows from the bottom of the inner or inlet tube 109, across the upper surface of the plate 21, through the aperture 110 in baffle plate 109, through the upper part of the annular recess 111, and up the outer tube 103 to the outlet 106. The feed tube 80 is similarly provided with passages 112 for the circulation of the heat transfer medium. The inlet and outlet connections for the passages 112 are not shown in the drawing.

At the open end of the mixing chamber 14, there is provided an end door 115 having spaced parallel vertical ribs 116 the upper ends of which are connected to pivot pins 117 (FIGS. 1 and 2). The pivot pins 117 are fixedly mounted in depending ears 118 carried by the machine frame 10. The pivot pins 117 permit the door 115 to swing freely in a counterclockwise direction from the closed vertical position shown in FIG. 1 to the open horizontal position shown in FIG. 4.

Pivotally connected to the machine frame 10 by lateral extensions 19 and disposed on opposite sides of the door 115 is a pair of guide rods 120. The pivotal connections at 119 provide for movement of the guide rods 120 about a common axis parallel to the axis of the door pivot pins 117. This pivotal movement of the guide rods 120 is of limited extent, as more fully explained below. Freely vertically slidably mounted on the guide rods 120 is a pair of bearing supports 121. A horizontally extending transverse locking bar 122 extends across the door 115. The ends of bar 122 are freely revolubly journaled in bearings 123 carried by the vertically slidable bearing supports 121. The bar 122 is provided with laterally extending lugs 124. The lugs 124 engage a hollow shaft 126 which is freely revolubly supported in the vertical ribs 116 and in outwardly projecting ears 127 formed on the outer face of the door 115. For stiffening purposes, the transverse bar 122 comprises a web portion 128 intermediate its ends, whereby its central transverse cross-sectional configuration is I-shaped.

The lower ends of the guide rods 120 are connected to horizontally movable pressure cylinders 129, of limited travel. The piston rods 130, of the pressure cylinders 129 are fixedly connected to the machine frame 10 so that the cylinders 129 move and the piston rods 130 remain fixed. The inlet and outlet connections for the pressure cylinders 129 have been omitted from the drawing for simplicity in illustration. They communicate, however, with opposite sides of the piston 132, through suitable control valve means (not shown) so that the cylinders 129 may be actuated at will, advantageously through common fluid pressure connections providing equal pressures.

Mounted at the outer end of each of the horizontally movable pressure cylinders 129 is a vertically operative pressure fluid actuated plunger 133. The lower portion of each plunger 133 is enclosed within a cylinder 134. The lower end of each cylinder 134 is fixedly connected to the outer end of one of the horizontally displaceable cylinders 129. An appropriate packing, not visible in the drawing, is provided to prevent leakage of pressure fluid past the plunger 133 whereby the introduction of pressure fluid into the vertically extending cylinders 134 will force the plungers 133 upwardly. The upper ends of the plungers 133 are connected to sleeves 135 the lower ends of which are connected by bolts 136 to the vertically movable bearing supports 121. The lines of action of the two plungers 133 are thus maintained parallel to the longitudinal axes of the guide rods 120. With the plungers 133 in their lowermost positions as shown in FIG. 1, the plane passing through the longitudinal axes of the transverse bar 122 and the hollow shaft 126 is horizontal and the door 113 is thereby locked against opening to an extent greater than that permitted by the horizontally displaceable pressure cylinders 129. Upon the application of pressure to the inner faces of the pistons 132, the cylinders 129 will force the lower ends of the guide rods 120 toward the machine frame 10 and thereby apply closing pressure to the door 115.

The door 115 is provided with circulatory passages 138 which communicate with fittings 139 for the circulation of a fluid heat transfer medium therethrough. The circulatory passages 139 supplement the action of similar passages described above for maintaining the mix within the chamber 14 at a desired temperature during operation of the kneading and mixing machine.

Referring to FIGS. 5, 6 and 7, means are provided, not illustrated in FIG. 1, for returning to the mix material which enters between the free ends of the mixing paddles 24 and 25 and the inner surface of the door 115. The door 115 is provided with a boss 140 and the free ends of the mixing paddles 24 and 25 are provided with bosses 141.

The bosses 141 on the ends of the mixing paddles are symmetrically arranged so that they are equidistant from the rotational axis of the paddle 24 or 25 with which they are associated. The boss 140 on the cover 115, however, is arranged eccentrically with respect to the axis of the particular mixing paddle with which it is associated, but its diameter is sufficient so that the rotational axis of the paddle, if extended, would pass through the boss 140. The diameters of the revolving bosses 141 and their locations are such that each of the bosses 141 passes successively in close proximity to the fixed boss 140. In this manner, material from the mix which enters the end space between the door 115 and the ends of the mixing paddles 24 and 25 is returned to the mix and the accumulation of material in this end space is prevented.

In operation, before the mixing of a batch is commenced, the door 115 is closed as shown in FIG. 1. The door 82 is open and the feed piston 90 is raised. A batch of material to be mixed is introduced into the feed tube 80 through the feed hopper 13. The door 82 of the feed tube is then closed. The yoke 93 is thereafter lowered by the pressure cylinders 97 and the feed piston 90 forces the material to be kneaded and mixed downwardly into the mixing chamber 14. The mixing paddles 24 and 25 are then driven to knead and mix the material in the mixing chamber 14. The door 115 is held closed under pressure applied by the cylinders 129 to the guide rods 120, and the feed piston floats upon the material in the mixing chamber 14, thereby accelerating the kneading and mixing operation and improving its efficiency. After the kneading and mixing operation has been completed, the pressure applied by the cylinders 129 is released and pressure is applied to the cylinders 134 to raise the plungers 133 and the bearing supports 121 to which they are connected. This brings the door 115 from its closed position shown in FIG. 1 to its open position shown in FIG. 4. Access to the entire interior of the mixing chamber 14 is thus obtained, permitting the finished mix to be conveniently discharged. If required, the mixing paddles 25 and 26 may be readily removed by pulling them from the ends of their respective drive shafts 27 and 28 so that the external surfaces of the mixing paddles and the entire internal surface of the mixing chamber 14 become freely accessible. This permits them to be thoroughly cleaned with a minimum expenditure of time and effort. In this manner, all residues from previously mixed batches may be completely removed from the kneading and mixing machine. The feed tube 80 is inherently self-cleaning by virtue of the action of the feed piston 90.

While we have shown what we believe to be the best embodiments of our invention, it will be apparent to those skilled in the art that various changes and modifications may be made therein without departing from the spirit and scope of the invention as defined in the appended claims.

What is claimed is:

1. Kneading and mixing apparatus, comprising in combination: at least one elongated revoluble paddle member; means defining a cylindrical surface of circular curvature coaxial with the rotational axis of said paddle member and partially surrounding said paddle member in close proximity thereto; end wall means connected to one edge of said cylindrical surface, the other edge of said cylindrical surface being free; side wall means having a side wall surface joined to the curved extremities of said cylindrical surface and to said end wall means, said side wall surface having a free edge which extends between the extremities of said free edge of said cylindrical surface, said free edges being substantially coplanar, said surfaces together with said end wall means defining a mixing chamber closed at one end and completely open at the other end; all of the interior surfaces of said mixing chamber being freely accessible for cleaning with said paddle member removed; shaft means extending through said end wall means, one end of said paddle member being removably connected to said shaft means to be driven thereby, the other end of said paddle member being free and being spaced inwardly of the plane of said free edges; a movable door cooperating with said free edges for closing said open end of said mixing chamber; and feed means for introducing material to be kneaded and mixed into the interior of said mixing chamber.

2. Kneading and mixing apparatus according to claim 1, wherein said paddle is of generally elliptical cross-sectional configuration with the ends of the major axis of every cross-sectional ellipse lying on a pair of diametrically opposed helices the longitudinal axes of which coincide with the rotational axis of said paddle member, rotation of said paddle member by said shaft means causing material being mixed in said chamber to be urged longitudinally of said paddle member away from said end wall means and toward said door.

3. Kneading and mixing apparatus according to claim 1, wherein said feed means comprises a feed tube one end of which communicates with said mixing chamber through said side wall means, said apparatus further comprising a feed piston longitudinally movably disposed in said tube, and power-operated means for applying pressure to said piston for forcing material to be mixed longitudinally of said tube into said chamber.

4. Apparatus according to claim 1, further comprising: a fixed pivot for said door, a pair of parallel guide rods disposed exteriorly of said chamber at opposite sides of said door, means for applying closure pressure to said door connected to one end of each guide rod, a bearing support carried by each guide rod, a bearing carried by each bearing support, a locking bar having its ends journaled in said bearings, said locking bar having lateral extensions pivotally connected to said door, and means for displacing said bearing supports longitudinally of said guide rods for opening and closing said door.

5. Mixing and kneading apparatus, comprising in combination: at least one revoluble mixing paddle; means defining a mixing chamber entirely open at one end and having a lateral wall including a cylindrical surface which partially surrounds said paddle, said chamber having an end wall extending transversely of the rotational axis of said paddle; a drive shaft having an end portion extending through said end wall, said paddle being detachably mounted on said end portion of said drive shaft; a feed tube communicating with said mixing chamber through said lateral wall thereof; a side door in said tube spaced longitudinally of said tube from said mixing chamber for introducing material to be mixed into said tube; a feed piston longitudinally slidably disposed in said tube, said piston engaging the walls of said tube for cleaning the same; means connected to said piston for urging said piston toward said mixing chamber to force material to be mixed into the interior of said chamber; a further door adapted to close the open end of said mixing chamber; hinge means for said further door for selectively bringing the further door either to a position in proximity to the free end of said mixing paddle to close said mixing chamber or to permit said further door to be moved away to open said mixing chamber for unobstructed access to the interior thereof through said open end, means for applying pressure to said further door to hold the further door closed during operation of said mixing apparatus, there being a space between the free end of said paddle and said further door when said further door is closed, and cooperating means carried by said further door and by said free end of said paddle for expelling and returning to the mix any material which enters said space.

6. Mixing apparatus according to claim 5, wherein said cooperating means comprises a circular boss on said further door and through which said rotational axis passes, said boss being eccentrically disposed with respect to said axis, and at least one further boss eccentrically mounted on the free end of said paddle, said last-named boss passing in close proximity to said first-named boss during each revolution of said paddle.

7. Kneading and mixing apparatus, comprising in combination: a pair of revoluble paddle members; means defining two cylindrical surfaces each of circular curvature coaxial with the rotational axis of and partially surrounding one of said paddle members in close proximity thereto, the rotational axes of said paddle members being parallel; common end wall means joined to one edge of each cylindrical surface, the other edges of said cylindrical surfaces being free; side wall means defining a side wall surface joining curved extremities of said cylindrical surfaces, one edge of said side wall surface being free, said free edges being substantially coplanar, said surfaces together with said end wall means defining a mixing chamber closed at one end and completely open at the other end, all of the interior surfaces of said mixing chamber being freely accessible for cleaning with said paddles removed; shaft means for each paddle member extending through said end wall means, one end of each paddle member being removably connected to said shaft means to be driven thereby, the other end of each paddle member being spaced inwardly of the plane of said free edges; a moveable door cooperating with said free edges for closing said open end of said mixing chamber; means for returning to the mix any material which enters between the free end of either paddle member and said door; and feed means communicating with the interior of said mixing chamber through said side wall means for introducing material to be kneaded and mixed into the interior of said mixing chamber.

References Cited in the file of this patent

UNITED STATES PATENTS

| | | |
|---|---|---|
| 1,355,305 | Bowen et al. | Oct. 12, 1920 |
| 1,356,691 | Bowen et al. | Oct. 26, 1920 |
| 1,475,638 | Low | Nov. 27, 1923 |
| 1,773,428 | Lewis | Aug. 19, 1930 |
| 1,938,377 | Ducharme et al. | Dec. 5, 1933 |
| 2,495,241 | Eaby | Jan. 24, 1950 |
| 2,495,242 | Jones | Jan. 24, 1950 |
| 2,770,477 | Rankin | Nov. 13, 1956 |
| 2,797,940 | Michener et al. | July 2, 1957 |